United States Patent
Wang et al.

(10) Patent No.: US 10,499,390 B2
(45) Date of Patent: Dec. 3, 2019

(54) BASE STATION, USER EQUIPMENT, TRANSMISSION CONTROL METHOD FOR BASE STATION AND DATA TRANSMISSION METHOD FOR USER EQUIPMENT

(71) Applicant: INSTITUTE FOR INFORMATION INDUSTRY, Taipei (TW)

(72) Inventors: Hai-Han Wang, Taipei (TW); Chun-Che Chien, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 9 days.

(21) Appl. No.: 15/927,751

(22) Filed: Mar. 21, 2018

(65) Prior Publication Data

US 2018/0279284 A1 Sep. 27, 2018

Related U.S. Application Data

(60) Provisional application No. 62/475,862, filed on Mar. 24, 2017.

(51) Int. Cl.
*H04W 72/04* (2009.01)
*H04W 72/14* (2009.01)
(Continued)

(52) U.S. Cl.
CPC ......... *H04W 72/044* (2013.01); *H04L 5/0048* (2013.01); *H04W 24/10* (2013.01);
(Continued)

(58) Field of Classification Search
CPC ............... H04B 17/318; H04B 7/0695; H04W 36/0055
See application file for complete search history.

(56) References Cited

U.S. PATENT DOCUMENTS

2011/0274056 A1 11/2011 Sampath et al.
2016/0353510 A1* 12/2016 Zhang ..................... H04L 43/16
(Continued)

FOREIGN PATENT DOCUMENTS

WO WO 2017/000291 A1 1/2017
WO WO 2017/024516 A1 2/2017

OTHER PUBLICATIONS

Guangdong Oppo Mobile Telecom, "On Beam Recovery Mechanism," 3GPP TSG RAN WG1 Meeting #88, R1-1701944, Athens, Greece, Feb. 13-17, 2017, 4 pages.

*Primary Examiner* — Melanie Jagannathan
(74) *Attorney, Agent, or Firm* — Birch, Stewart, Kolasch & Birch, LLP

(57) ABSTRACT

A base station, a user equipment (UE), a transmission control method for the base station and a data transmission method for the UE are provided. The base station generates an uplink (UL) resource association message that indicates the association between multiple downlink (DL) transmit (Tx) beams and multiple UL beam recovery resources. The base station transmits the UL resource association message to the UE. Upon detecting that a DL Tx beam failure event occurs on a beam pair link with the base station, the UE performs an UL transmission on a first UL beam recovery resource of the UL beam recovery resources. The base station transmits, in response to the UL transmission of the UE, a beam configuration message to the UE, so as to configure a first DL Tx beam associated with the first UL beam recovery resource into the beam pair links.

17 Claims, 6 Drawing Sheets

(51) Int. Cl.
  *H04W 24/10*   (2009.01)
  *H04L 5/00*   (2006.01)
  *H04W 88/02*   (2009.01)
  *H04W 88/08*   (2009.01)

(52) U.S. Cl.
  CPC ....... *H04W 72/0406* (2013.01); *H04W 72/14* (2013.01); *H04W 88/02* (2013.01); *H04W 88/08* (2013.01)

(56) References Cited

U.S. PATENT DOCUMENTS

| | | | |
|---|---|---|---|
| 2017/0359826 A1* | 12/2017 | Islam | H04L 5/0048 |
| 2018/0219604 A1* | 8/2018 | Lu | H04B 7/0695 |
| 2018/0227898 A1* | 8/2018 | Noh | H04B 7/02 |
| 2018/0234960 A1* | 8/2018 | Nagaraja | H04B 17/318 |
| 2018/0278310 A1* | 9/2018 | Lee | H04L 5/0053 |
| 2018/0278467 A1* | 9/2018 | John Wilson | H04B 7/0695 |
| 2018/0279286 A1* | 9/2018 | Akoum | H04W 74/0833 |
| 2018/0368126 A1* | 12/2018 | Islam | H04W 16/28 |
| 2019/0052343 A1* | 2/2019 | Li | H04W 72/046 |
| 2019/0058629 A1* | 2/2019 | Akoum | H04L 5/0048 |
| 2019/0081686 A1* | 3/2019 | Wang | H04B 7/0408 |
| 2019/0081687 A1* | 3/2019 | Sadiq | H04B 7/0408 |

\* cited by examiner

BASE STATION, USER EQUIPMENT, TRANSMISSION CONTROL METHOD FOR BASE STATION AND DATA TRANSMISSION METHOD FOR USER EQUIPMENT

This application claims the benefit of U.S. provisional application Ser. No. 62/475,862, filed Mar. 24, 2017, the subject matter of which is incorporated herein by reference.

TECHNICAL FIELD

The present disclosure relates to a base station, a user equipment (UE), a transmission control method for the base station and a data transmission method for the UE.

BACKGROUND

With the development of wireless communication technology, more and more users are using mobile devices (e.g., smart phones, tablet computers or the like) to transmit data for the purposes of communications, multimedia transmissions or the like. To ensure that mobile communication services of high-quality are provided for the users, new wireless communication standards (e.g., 5G mobile communication systems) are developed for high-frequency spectrum usage.

However, using a high-frequency spectrum (e.g. 28 GHz to 100 GHz) may face the problem of severe signal attenuation. Therefore, some specialists and operators have proposed beamforming technology, which allows the base station to form directional beams and track the moving UE to ensure that the service quality between the base station and the UE is stable and reliable. However, the use of beamforming technology has some limitations. For example, once a UE leaves the coverage of the original serving beam from the base station due to a rapid movement or a change of orientation, the UE may suffer from poor transmission quality or even service interruption.

SUMMARY

The present disclosure relates to a base station, a UE, a transmission control method for the base station and a data transmission method for the UE. According to the present disclosure, a plurality of uplink (UL) beam recovery resources are pre-allocated to the UE. The UE can use the UL beam recovery resources to initiate an UL transmission when detecting a downlink (DL) transmit (Tx) beam failure event. In response to the UL transmission initiated by the UE, the base station may determine a proper DL Tx beam in time to communicate with the UE. Accordingly, the wireless transmission mechanism of the present disclosure can not only improve the service reliability of beamforming, but also reduce the transmission delay caused by varying beam quality.

According to an aspect of the present disclosure, a base station for a wireless communication system is provided. The base station being is capable of providing a plurality of DL Tx beams and adapted to communicating with a UE in the wireless communication system via one or more beam pair links. The base station includes a transceiver and a processor. The processor is coupled to the transceiver and is configured to execute the following operations of: generating an UL resource association message, wherein the UL resource association message is used to indicate an association between the DL Tx beams and a plurality of UL beam recovery resources; transmitting the UL resource association message through the transceiver; detecting whether an UL transmission is on any of the UL beam recovery resources, wherein the UL transmission is initiated by the UE responding to a DL Tx beam failure event; and upon detecting that the UL transmission is on a first UL beam recovery resource of the UL beam recovery resources, transmitting a beam configuration message to configure a first DL Tx beam of the DL Tx beams that is associated with the first UL beam recovery resource into the one or more beam pair links.

According to another aspect of the present disclosure, a UE for a wireless communication system is provided. The UE is capable of communicating with a base station in the wireless communication system via one or more beam pair links. The UE comprises a transceiver and a processor. The processor is coupled to the transceiver and configured to execute the following operations of: receiving an UL resource association message through the transceiver, wherein the UL resource association message is used to indicate an association between a plurality of DL Tx beams of the base station and a plurality of UL beam recovery resources; determining whether a DL Tx beam failure event occurs; upon determining that the DL Tx beam failure event occurs, selecting a first DL Tx beam from the DL Tx beams and performing an UL transmission on a first UL beam recovery resource associated with the first DL Tx beam; and receiving a beam configuration message through the transceiver and configuring the first DL Tx beam into the one or more beam pair links accordingly.

According to another aspect of the present disclosure, a transmission control method for a base station of a wireless communication system is provided. The base station is capable of providing a plurality of DL Tx beams and adapted to communicating with a UE in the wireless communication system via one or more beam pair links. The transmission control method comprises: generating an UL resource association message, wherein the UL resource association message is used to indicate an association between the DL Tx beams and a plurality of UL beam recovery resources; transmitting the UL resource association message; detecting whether an UL transmission is on any of the UL beam recovery resources, wherein the UL transmission is initiated by the UE responding to a DL Tx beam failure event; and upon detecting that the UL transmission is on a first UL beam recovery resource of the UL beam recovery resources, transmitting a beam configuration message to configure a first DL Tx beam of the DL Tx beams that is associated with the first UL beam recovery resource into the one or more beam pair links.

According to another aspect of the present disclosure, a data transmission method for a UE of a wireless communication system is provided. The UE is capable of communicating with a base station in the wireless communication system via one or more beam pair links. The data transmission method comprises: receiving an UL resource association message, wherein the UL resource association message is used to indicate an association between a plurality of DL Tx beams of the base station and a plurality of UL beam recovery resources; determine whether a DL Tx beam failure event occurs; upon determining that the DL Tx beam failure event occurs, selecting a first DL Tx beam from the DL Tx beams and performing an UL transmission on a first UL beam recovery resource associated with the first DL Tx beam; and receiving a beam configuration message and configuring the first DL Tx beam into the one or more beam pair links accordingly.

The detailed technology and preferred embodiments implemented for the subject invention are described in the following paragraphs accompanying the appended drawings for people skilled in this field to well appreciate the features of the claimed invention.

Figure 1:
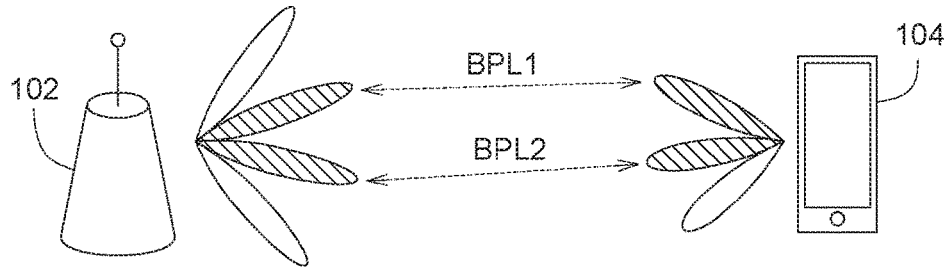
FIG. 1 is a schematic diagram of a wireless communication system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a schematic diagram of a wireless communication system 100 according to an embodiment of the present disclosure. To simplify the description, FIG. 1 only shows a base station 102 and a UE 104 in the wireless communication system 100. However, as can be readily appreciated by those of ordinary skill in the art, the wireless communication system 100 may include one or more base stations and one or more UEs in practical use scenarios, and each base station may serve a plurality of UEs.

Each of the base station 102 and the UE 104 may include a transceiver and a processor. The transceiver is configured to transmit and receive signals. The processor is coupled to the transceiver and configured to execute the operations according to the embodiments of the present disclosure. It should be noted that in the operations of the following method of the embodiments of the present disclosure, no particular sequence is required unless otherwise specified. Moreover, the following operations also may be performed simultaneously or the execution times thereof may at least partially overlap. The processor may be implemented, for example, through a microcontroller, a microprocessor, a digital signal processor, an application specific integrated circuit (ASIC), a digital logic circuit, a field programmable gate array (FPGA) or any other electronic circuit with data processing functions.

The base station 102 may be a transmission-reception point (TRP) with beamforming capability. The base station 102 may provide a plurality of DL Tx beams, with each of which corresponding to a different directivity angle. A specific DL Tx beam of the base station 102 and a specific receive (Rx) beam of the UE 104 form a beam pair link (BPL). The base station 102 may use the beam pair link to transmit control messages to the UE 104.

One or more beam pair links may be established between the base station 102 and the UE 104 for communication. As shown in FIG. 1, two beam pair links BPL1 and BPL2 (as indicated by shaded beams in this figure) are configured between the base station 102 and the UE 104 for data transmission.

For DL transmission, a beam pair link may refer to a beam pair including a Tx beam of the base station for transmitting control messages/data and an Rx beam of the UE for receiving the Tx beam of the base station. Reciprocally, for UL transmission, a beam pair link may refer to a beam pair including a Tx beam of the UE for transmitting control messages/data and an Rx beam of the base station for receiving the Tx beam of the UE. Compared to the beams that are not configured into beam pair links, the base station may configure resources in the beam pair links to transmit control messages to the UE.

Figure 2:
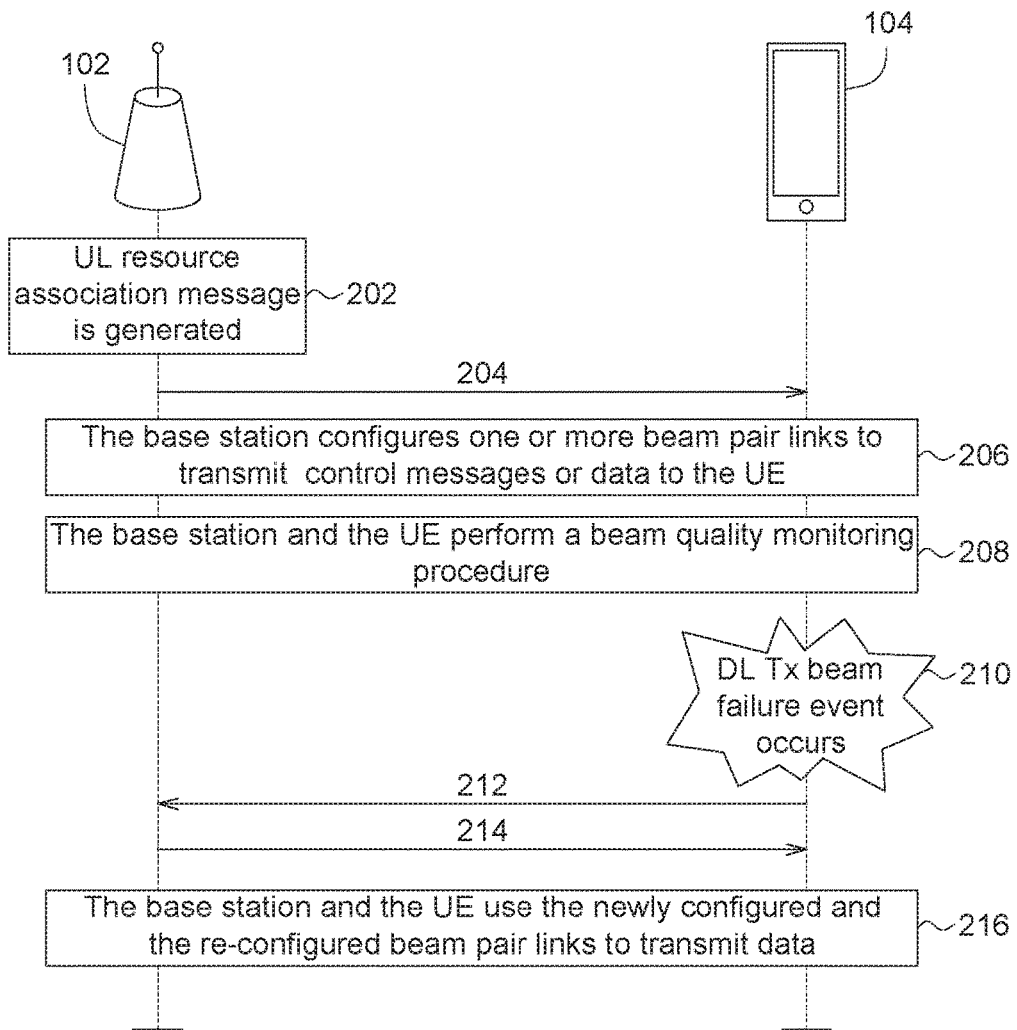
FIG. 2 is a schematic diagram illustrating the signal transmission between the base station and the UE according to an embodiment of the present disclosure.

FIG. 2 is a schematic diagram illustrating the signal transmission between the base station 102 and the UE 104 according to an embodiment of the present disclosure.

In operation 202, the base station 102 generates an UL resource association message. The UL resource association message is configured to indicate the association between the DL Tx beams of the base station 102 and a plurality of UL beam recovery resources. The association may be realized by, for example, look-up tables or other known data structures. According to the embodiment of the present disclosure, the UL beam recovery resource is a kind of UL transmission resource which is allocated by the base station to the UE for performing UL transmission when a DL Tx beam failure event occurs.

In operation 204, the base station 102 transmits the UL resource association message to the UE 104.

In operation 206, the base station 102 configures one or more beam pair links to transmit control messages or data to the UE 104.

For example, the base station 102 may first transmit DL Tx beams with different directional angles to the UE 104 for measurements. Then, the UE 104 may send a measurement report about the DL Tx beam quality back to the base station 102, so that the base station 102 can choose a proper DL Tx beam for the UE 104 for transmission. This process may further include a fine-tune operation for the DL Tx beam. Namely, after the base station 102 initially selects an appropriate DL Tx beam for the UE 104, the base station 102 may further increase the directivity of the selected DL Tx beam and fine-tune the transmission angles of the selected DL Tx in the direction of the selected DL Tx beam for the UE 104 to measure, so as to select a DL Tx beam that is more suitable for the UE 104. After the base station 102 determines the DL Tx beam, the UE 104 may also adjust the Rx beam direction to determine an appropriate Rx beam for the base station 102. The DL Tx beam of the base station 102 and the Rx beam of the UE 104 determined in above may form a beam pair link. The base station 102 may configure transmission resources in the beam pair link to transmit control messages to the UE 104. The UE 104 may listen to the control messages from the base station 102 in particular time slots according to a specific detection period indication. For example, the base station 102 may configure a physical downlink control channel (PDCCH) in the DL Tx beam of the beam pair link to transmit control messages to the UE 104 in order to notify the UE 104 of a transport format, a resource allocation, a HARQ feedback, an UL grant and the like.

Multiple beam pair links can be separated into one or more primary beam pair links and one or more secondary beam pair links. The UE 104 may use different detection periods to detect control messages on the main beam pair and the secondary beam pair, respectively. For example, the PDCCH on the primary beam pair link may be detected in a shorter detection period (e.g., every P time slots) while the PDCCH on the secondary beam pair link may be detected in a longer detection period (e.g., every K time slots, where K>P). The time slot may refer to, for example, a DRX on-duration.

In operation 208, the base station 102 and the UE 104 perform a beam quality monitoring procedure which allows the UE 104 to measure the beam quality of the respective DL Tx beams of the base station 102. In an embodiment, the base station 102 configures each DL Tx beam with a corresponding reference signal set, and transmits the reference signal sets to the UE 104, so that the UE 104 measures beam quality of the DL Tx beams of the base station 102 accordingly. The reference signal set may be synchronization signals, channel state information reference signals (CSI-RSs) or the like, depending on the complete design of the reference signals. The beam quality can be measured by various signal quality indicators, such as reference signal received power (RSRP), channel quality indicator (CQI), signal-to-interference-plus-noise ratio, (SINR), signal-to-noise ratio (SNR), received signal strength indicator (RSSI), reference signal received quality (RSRQ), rank indicator (RI) and the like. In an embodiment, the base station 102 may further provide the UE 104 with configurations of the reference signal sets to inform the UE 104 at what time-frequency resources to measure the reference signals.

In operation 210, the UE 104 detects that a DL Tx beam failure event occurs. As an example, the DL Tx beam failure event may refer to the situation that the UE 104 detects that the beam quality of the DL Tx beam that the base station 102 uses in the beam pair link is less than a threshold for a specific period of time. For example, when the UE 104 detects that the RSRP of the primary DL Tx beam of the base station 102 is less than a predetermined threshold for a specific period of time, the UE 104 determines that a DL Tx beam failure event occurs. The specific period of time can be determined by a configurable timer.

In operation 212, upon determining that the DL Tx beam failure event has occurred, the UE 104 may select a first DL Tx beam from the DL Tx beams of the base station 102 according to the measured beam quality obtained from the beam quality monitoring procedure, and perform the UL transmission on a first UL beam recovery resource associated with the first DL Tx beam.

The first DL Tx beam may be a DL Tx beam from the base station 102 with the best or better beam quality measured by the UE 104 in operation 208. Because the base station 102 records the correspondence between the UL beam recovery resources and the respective DL Tx beams, once an UL transmission initiated by the UE 104 is detected on the first UL beam recovery resource by the base station 102, the base station 102 learns that a DL Tx beam failure event happens on the UE 104 side, and currently a DL Tx beam with the best or better beam quality is the first DL Tx beam associated with the first UL beam recovery resource.

In accordance with embodiments of the present disclosure, the UL transmission performed by the UE 104 when the DL Tx beam failure event occurs includes the following three types: (1) beam recovery type, (2) scheduling request type, and (3) grant-free UL transmission type.

For type (1), the UE 104 may select an UL beam recovery resource to transmit a beam recovery signal. The beam recovery signal may be used to notify the base station 102 of the fact that a DL Tx beam failure event occurs. Therefore, if the UE 104 has no UL data to transmit when the DL Tx beam failure event occurs, the UE 104 may simply notify the base station 102 of the occurrence of the DL Tx beam failure event by performing the UL transmission of type (1).

For type (2), the UE 104 may transmit a scheduling request on the selected UL beam recovery resource. In addition to notifying the base station 102 of the DL Tx beam failure event, the scheduling request is also used to request the base station 102 to provide an UL transmission grant. Therefore, if the UE 104 has UL data to transmit when the DL Tx beam failure event occurs, the UE 104 may perform an UL transmission of type (2) to request the base station 102 to provide an UL transmission grant to permit the UL data transmission.

The (1) and (2) types of UL transmission can be realized by using sequence based scheme, such as ZC sequences or pseudo random sequences. In an embodiment, the (1) and (2) types of UL transmission can be distinguished by using different frequency resources, different sequences, different cyclic shifts of the same sequence, or a combination of the above.

For type (3), the base station 102 allows the UE 104 to upload the user data without an UL transmission grant. Namely, according to this type of transmission, the UE 104 may directly send the user data on the selected UL beam recovery resource when the DL Tx beam failure event occurs. In an embodiment, to avoid data collision, multiple UEs may use different reference signals (e.g., orthogonal sequences) to transmit data, so that the base station 102 may decode the information of each UE by using an advanced receiver.

The UL transmission of the UE 104 in operation 212 may further include a UE identifier (ID), such as the international mobile subscriber identity (IMSI) of the UE 104, so that the base station 102 can use the UE ID to identify the identity of the UE 104. Different UE IDs may be implemented by using, for example, different frequency resources, different sequences, different cyclic shifts of the same sequence, or a combination of the above.

In an embodiment, the UL transmission may further include a beam index message for indicating what beam pair links are "still usable". The so-called "still usable" beam pair link may refer to a beam pair link of which the beam quality remains above a certain threshold and is not deemed as a failed beam pair link. For example, if the beam pair links used by the base station 102 and the UE 104 include a primary beam pair link and a secondary beam pair link, when the measured RSRP of the DL Tx beam of the primary beam pair link is less than the threshold for a specific period of time, while the RSRP of the DL Tx beam of the secondary beam link still remains above the threshold, the beam index message may include the beam index of the secondary beam pair link to indicate that the currently usable beam pair link is the secondary beam pair link.

In another embodiment, the beam index message may be used to indicate what beam pair links are failed. For example, when the UE 104 monitors that the secondary beam pair link is failed in addition to the failure of the primary beam pair link, the UE 104 may provide the base station 102 with a beam index message to indicate the beam index of the failed secondary beam pair link. Different beam indexes can be represented by different frequency resources, different sequences, different cyclic shifts of the same sequence, or a combination of the above.

In another embodiment, the UL transmission may further includes a detection period indication, where the detection period indication is used to indicate a detection period to be used by the UE 104 in response to the DL Tx beam failure event for detecting control messages. The base station 102 may use the detection period indication from the UE 104 to determine a minimum period for transmitting the control messages. For example, if the UE 104 initially monitors the control messages (e.g., control messages carried on the PDCCH) on the secondary beam pair link every K time slots, and that the secondary beam pair link is still usable when the DL Tx beam failure event occurs, the UE 104 may put a detection period indication in the UL transmission to notify the base station 102 that it will change the period of monitoring the secondary beam pair link, such as shortening the period of monitoring the control messages on the secondary beam pair link to every Q time slots, where Q<K. The base station 102 may adjust the minimum period of transmitting the control messages on the secondary beam pair in response to the detection period indication. For example, the base station 102 may change to transmit the control messages to the UE 104 every Q time slots in order to reduce the transmission delay caused by beam failure.

In another embodiment, as long as an UL transmission on the UL beam recovery resource is detected by the base station 102, the base station 102 automatically adjusts, without being indicated by the detection period indication of the UE 104, the minimum period of transmitting the control messages, such as changing to transmit the control messages on the secondary beam pair link every time slot.

In operation 214, the base station 102 transmits a beam configuration message to configure the first DL Tx beam into a beam pair link. Once the first DL Tx beam is configured into a beam pair link, the base station 102 may allocate transmission resources for the UE 104 in the first DL Tx beam, such as corresponding PDCCH or other transmission resources for the UE 104.

In operation 216, the base station 102 and the UE 104 use the newly configured and the re-configured beam pair links to transmit data. For example, if the UE 104 detects that the primary beam pair link is failed and the secondary beam pair link is still usable, the base station 102 may re-configure the original secondary beam pair link as the primary beam pair link according to the above information, and further configure the first DL Tx beam into a new beam pair link.

Figure 3:
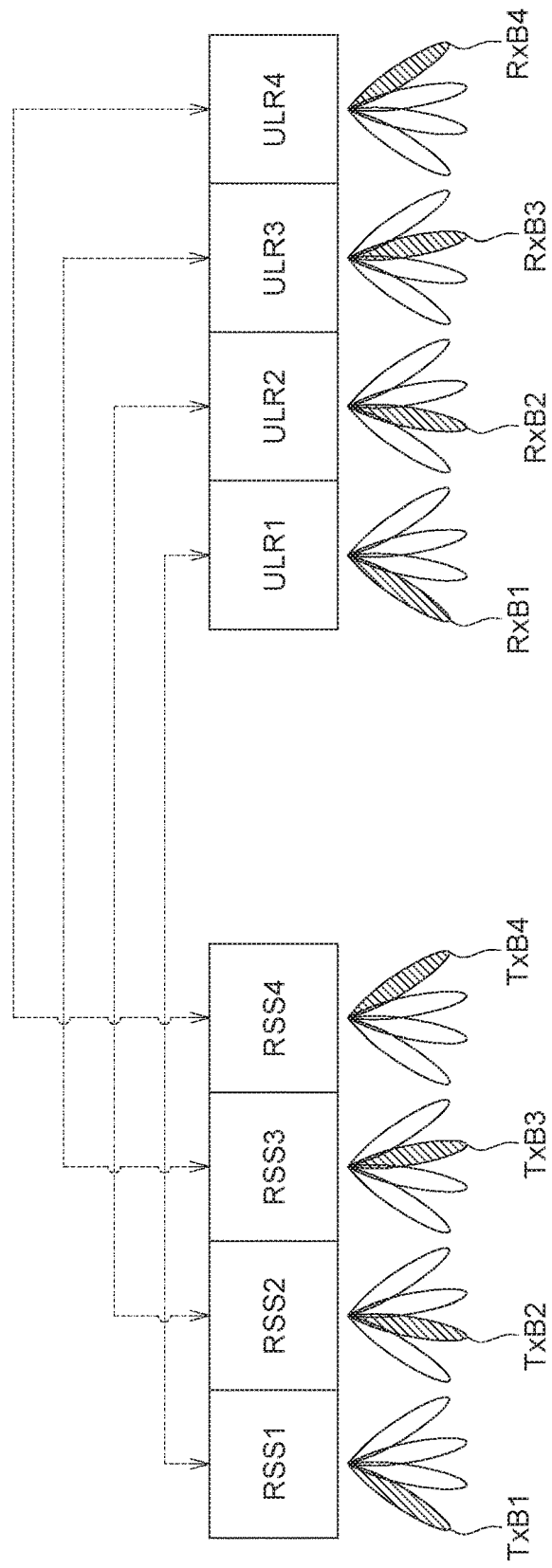
FIG. 3 is a schematic diagram illustrating the association between the UL beam recovery resources and the DL Tx beams of the base station.

FIG. 3 is a schematic diagram illustrating the association between the UL beam recovery resources and the DL Tx beams of the base station 102. To simplify the description, FIG. 3 only shows four UL beam recovery resources ULR1-ULR4 and the corresponding four DL Tx beams TxB1-TxB4. However, it is understood that the present disclosure is not limited thereto. In practical use scenarios, the base station 102 can provide a plurality of DL Tx beams, where each of which is corresponding to an UL beam recovery resource/Rx beam.

The base station 102 may record the correspondence between the DL Tx beams TxB1-TxB4 and the Rx beams RxB1-RxB4 (i.e., the Tx/Rx beam correspondence). The base station 102 may determine the Rx beams RxB1-RxB4 for UL reception based on the UE 104's DL measurement reports on the DL Tx beams TxB1-TxB4, or determine the DL Tx beams TxB1-TxB4 for DL transmission based on the base station 102's UL measurement on the Rx beams RxB1-RxB4.

The Rx beams RxB1-RxB4 may be one-to-one mapping to the UL beam recovery resources ULR1-ULR4. The UL beam recovery resources ULR1-ULR4 are associated with the DL Tx beams TxB1 to TxB4 of the base station 102, respectively. Different UL beam recovery resources ULR1-ULR4 may be configured in the same frequency spectrum and distinguished in time domain.

The DL Tx beams TxB1-TxB4 correspond to the reference signal sets RSS1-RSS4, respectively. Each of the reference signal sets RSS1-RSS4 may include one or more reference signals, such as synchronization signals, channel status information reference signals and the like. The base station 102 may transmit the reference signal sets RSS1-RSS4 to the UE 104, so that the UE 104 can use them to measure the beam quality of the DL Tx beams. For example, the base station 102 may sequentially transmit the reference signal sets RSS1-RSS4 at different time points, so that the UE 104 measures the beam quality of the DL Tx beams TxB1-TxB4 accordingly.

After that, once the UE 104 detects a DL Tx beam failure event, the UE 104 may use the results of the foregoing measurements to select an UL beam recovery resource to perform the UL transmission. For example, if the UE 104 finds that the reference signal set RSS1 has the best signal quality among the reference signal sets RSS1-RSS4, namely, the DL Tx beam TxB1 has the best beam quality, then when a DL Tx beam failure event occurs, the UE 104 may use the UL beam recovery resource ULR1 associated with the DL Tx beam TxB1 to perform the UL transmission.

For the base station 102, the Rx beams RxB1-RxB4 are corresponding to the UL beam recovery resources ULR1-ULR4, respectively. Therefore, when the base station 102 detects an UL transmission from the UE 104 via the Rx beam RxB1, the base station 102 can determine that a DL Tx beam failure event happens on the UE 104 side and the DL Tx beam TxB1 that is corresponding to the UL beam recovery resource ULR1 has the best/best beam quality for the UE 104. Through this mechanism, the UL beam recovery resources ULR1-ULR4 act as indications of the DL Tx beams TxB1-TAM. The base station 102 only needs to determine which UL beam recovery resources ULR1-ULR4 have the UL transmission from the UE 104, and can identify which DL Tx beam currently has the best beam quality with respect to the UE 104.

Figure 4:
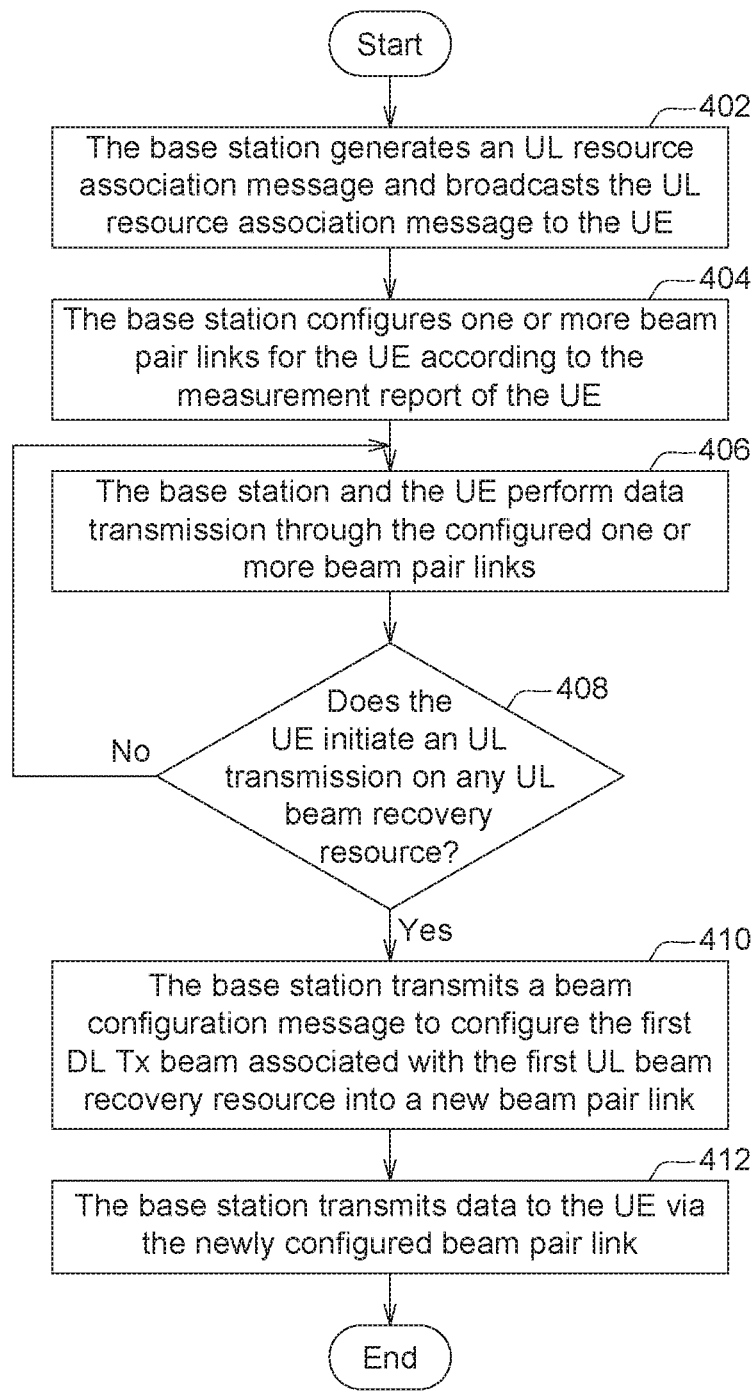
FIG. 4 is a flowchart of a transmission control method for the base station according to an embodiment of the present disclosure.

FIG. 4 is a flowchart of a transmission control method for the base station 102 according to an embodiment of the present disclosure. In operation 402, the base station 102 generates an UL resource association message and broadcasts the UL resource association message to the UE 104.

In operation 404, the base station 102 configures one or more beam pair links for the UE 104 according to the measurement report of the UE 104.

In operation 406, the base station 102 and the UE 104 perform data transmission through the configured one or more beam pair links.

In operation 408, the base station 102 determines whether the UE 104 initiates an UL transmission on any UL beam recovery resource (e.g., the first UL beam recovery resource).

If the determination in operation 408 is positive, e.g., the base station 102 detects that the UL transmission initiated by the UE 104 is on the first UL beam recovery resource, in operation 410, the base station 102 transmits a beam configuration message to configure the first DL Tx beam into a new beam pair link.

If the determination in operation 408 is negative, the flow returns to operation 406, in which the base station 102 continues to use the originally configured one or more beam pair links to communicate with the UE 104.

In operation 412, the base station 102 transmits data to the UE 104 via the newly configured beam pair link.

Figure 5:
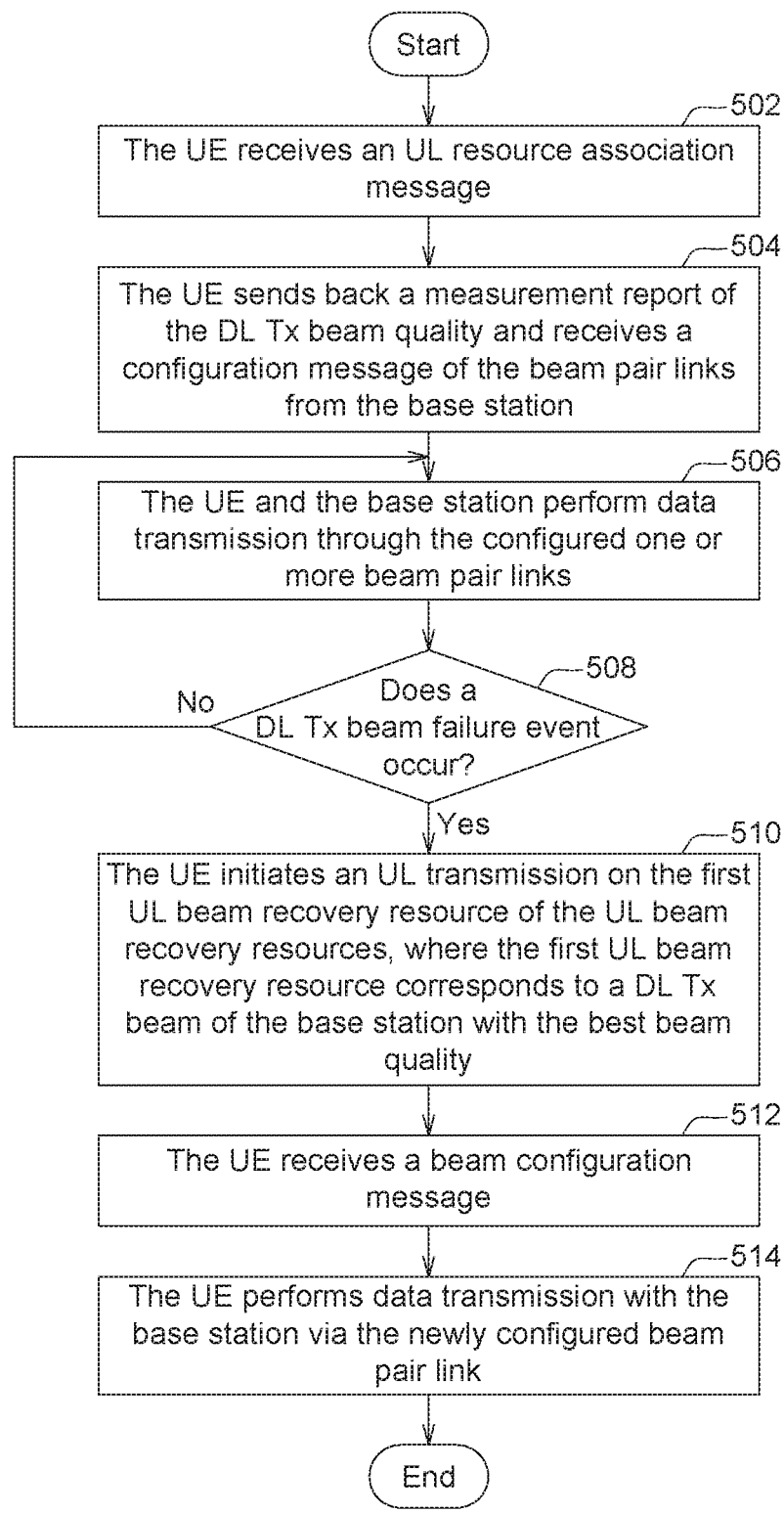
FIG. 5 is a flowchart of a data transmission method for the UE according to an embodiment of the present disclosure.

FIG. 5 is a flowchart of a data transmission method for the UE 104 according to an embodiment of the present disclosure.

In operation 502, the UE 104 receives an UL resource association message from the base station 102, where the UL resource association message describes the correspondence between the DL Tx beams of the base station 102 and the UL beam recovery resources.

In operation 504, the UE 104 sends back a measurement report of the DL Tx beam quality and receives a configuration message of the beam pair links from the base station 102.

In operation 506, the UE 104 and the base station 102 perform data transmission through the configured one or more beam pair links.

In operation 508, the UE 104 determines whether a DL Tx beam failure event occurs. For example, when the UE 104 detects that the RSRP of a DL Tx beam in the primary beam pair link is less than a threshold for a specific period of time, the UE 104 learns that a DL Tx beam failure event occurs.

If the determination in operation 508 is positive, in operation 510, the UE 104 initiates an UL transmission on the first UL beam recovery resource of the UL beam recovery resources, where the first UL beam recovery resource corresponds to a DL Tx beam of the base station 102 with the best beam quality, such as the DL Tx beam with the best RSRP as measured.

If the determination in operation 508 is negative, the flow returns to operation 506, in which the UE 104 continues to use the originally configured one or more beam pair links to communicate with the base station 102.

In operation 512, the UE 104 receives a beam configuration message. In an embodiment, the beam configuration message further provides, in addition to information for configuring the first DL Tx beam into a beam pair link, configuration information of other still-usable beam pair links, such as the minimum transmission period for the control message and the resource locations.

In operation 514, the UE 104 performs data transmission with the base station 102 via the newly configured beam pair link.

Figure 6:
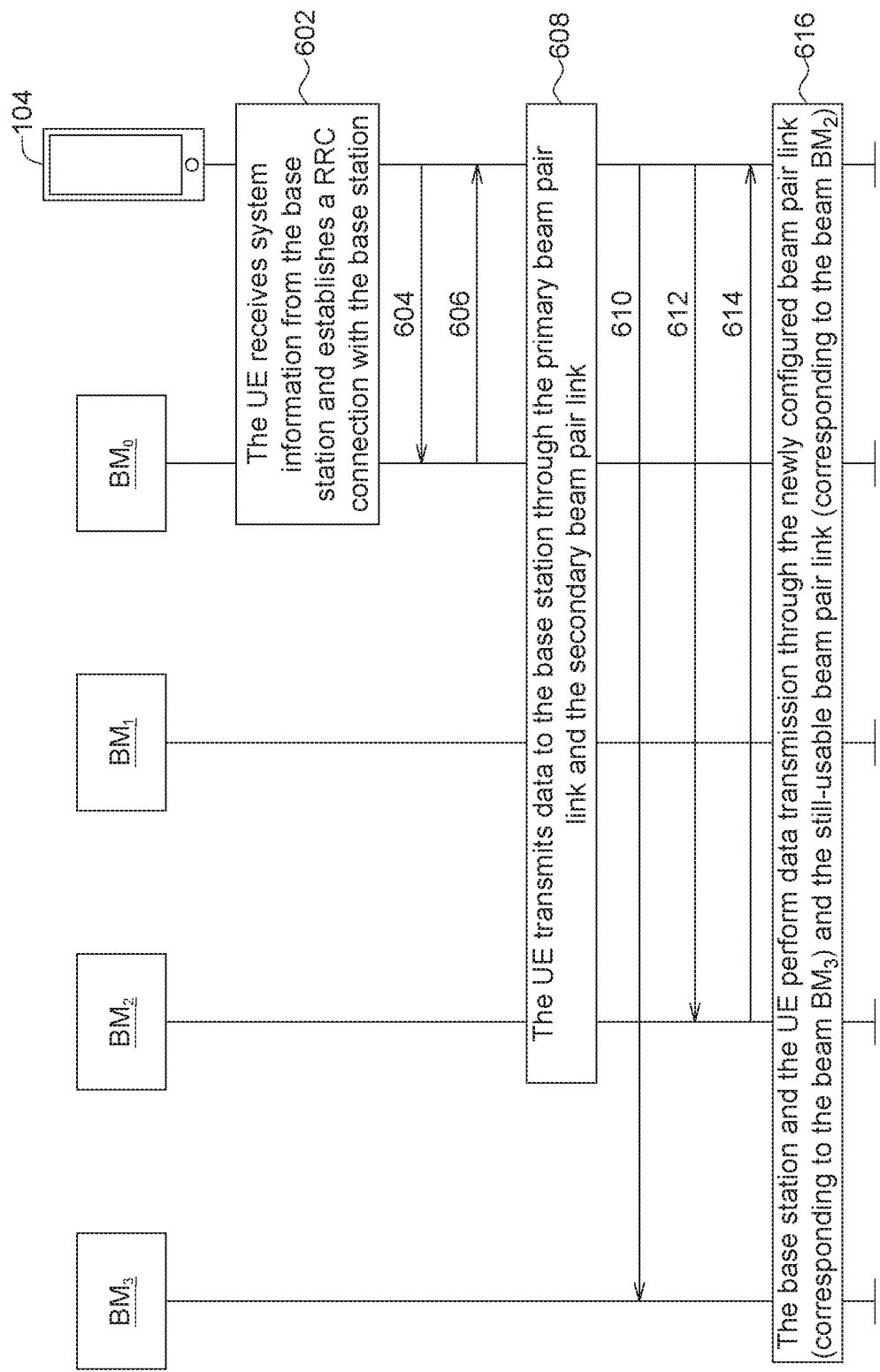
FIG. 6 is a schematic diagram illustrating the signal transmission among different DL Tx beams of the base station and the UE.

FIG. 6 is a schematic diagram illustrating the signal transmission among different DL Tx beams $BM_0$-$BM_3$ of the base station 102 and the UE 104.

In operation 602, the UE 104 receives system information from the base station 102 via the DL Tx beam $BM_0$ and establishes a radio resource control (RRC) connection with the base station 102. For example, the system information may include an UL resource association message, a scheduling request and UL grant-free resources on each beam.

In operation 604, the UE 104 reports a measurement report of the beam quality to the base station 102, so that the base station 102 can configure the beam pair links accordingly. In this embodiment, the base station 102 configures the DL Tx beam $BM_1$ and the DL Tx beam $BM_2$ as the primary beam pair link and the secondary beam pair link, respectively.

In operation 606, the UE 104 receives a beam configuration message, so that the beam pair links to the base station 102 for data transmission are confirmed.

In operation 608, the UE 104 transmits data with the base station 102 through the primary beam pair link and the secondary beam pair link.

In operation 610, the UE 104 detects that a DL Tx beam failure event happens on the DL Tx beam $BM_1$ and determines that the DL Tx beam $BM_3$ that has not been configured in a beam pair link has the best beam quality. Accordingly, the UE 104 initiates an UL transmission on the UL beam recovery resource corresponding to the DL Tx beam $BM_3$ according to the UL resource association message.

In this embodiment, the UL transmission initiated by the UE 104 is a grant-free UL transmission. Therefore, the UE 104 can directly transmit the user data to the base station 102 on the selected UL beam recovery resource.

On the other hand, in operation 612, the UE 104 may also use the still-usable secondary beam pair link (which is corresponding to the DL Tx beam $BM_2$) to transmit the user data.

In an embodiment, if the UE 104 is unable to use more than two beams for grant-free UL transmission at the same time, the UE 104 may use one of the beams to perform the UL transmission according to an expected block error rate (BLER) with respect to the base station 102's DL Tx beam of the corresponding resources.

In operation 614, the base station 102 transmits a beam configuration message to the UE 104 via the secondary beam pair in order to configure the DL Tx beam $BM_3$ into a new beam pair link.

In operation 616, the base station 102 and the UE 104 perform data transmission through the newly configured beam pair link (corresponding to the beam $BM_3$) and the still-usable beam pair link (corresponding to the beam $BM_2$).

Figure 7:
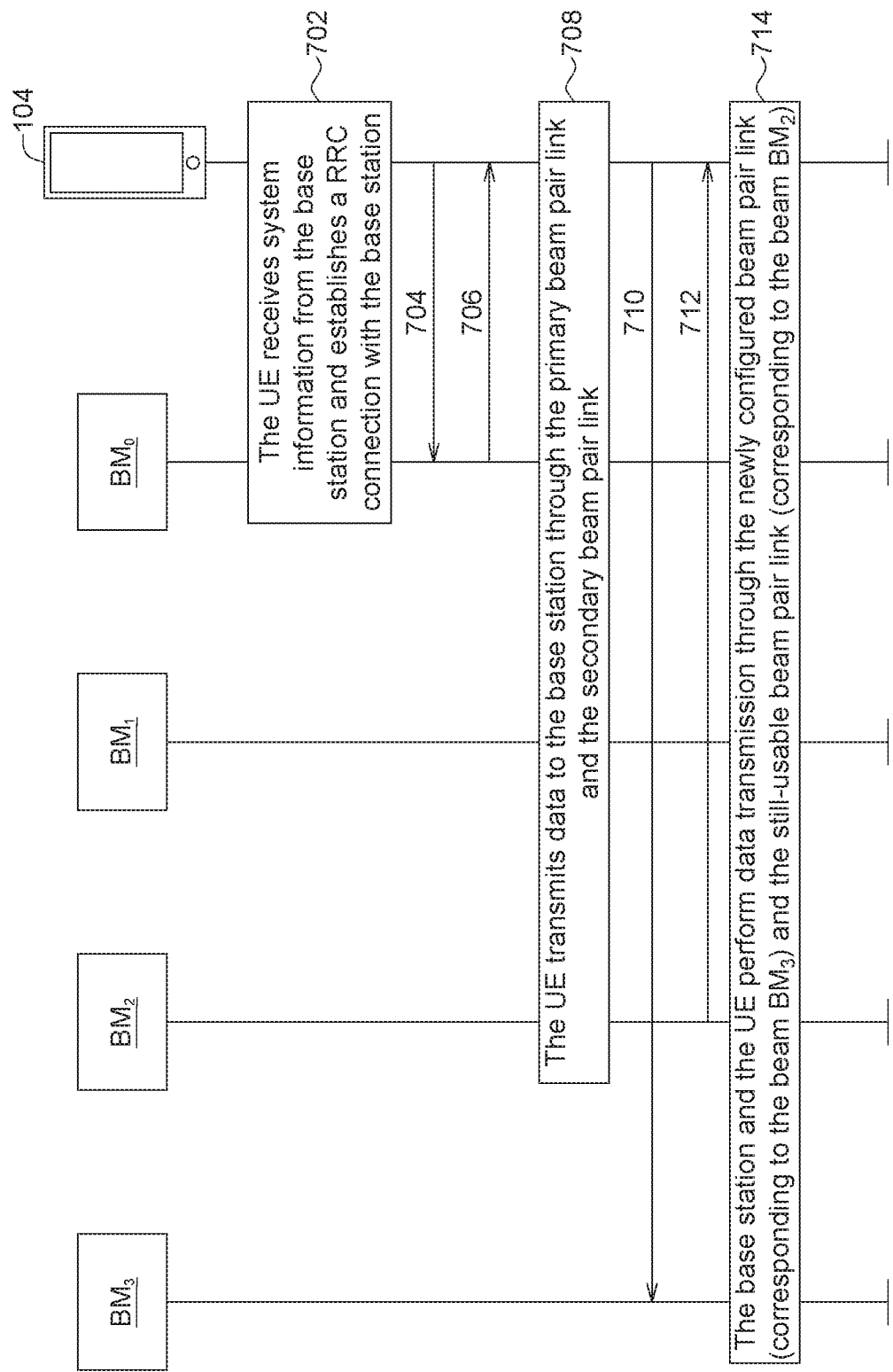
FIG. 7 shows another example of the signal transmission among different DL Tx beams of the base station and the UE.

FIG. 7 shows another example of the signal transmission among different DL Tx beams $BM_0$-$BM_3$ of the base station 102 and the UE 104.

In this embodiment, the type of the UL transmission initiated by the UE 104 at the time that the DL Tx beam failure event occurs is a scheduling-request type.

As shown in FIG. 7, in operation 702, the UE 104 at first receives system information from the base station 102 via the DL Tx beam $BM_0$ and establishes a RRC connection with the base station 102. For example, the system information may include an UL resource association message, a scheduling request and UL grant-free resources on each beam.

In operation 704, the UE 104 reports a measurement report of beam quality to the base station 102, so that the base station 102 configures the beam pair links accordingly. In this embodiment, the base station 102 configures the DL Tx beam $BM_1$ and the DL Tx beam $BM_2$ into the primary beam pair link and the secondary beam pair link, respectively.

In operation 706, the UE 104 receives a beam configuration message from the base station 102 and confirms the beam pair links to be used.

In operation 708, the UE 104 uses the primary beam pair link and the secondary beam pair link to transmit data to the base station 102.

In operation 710, the UE 104 detects that a DL Tx beam failure event happens on the DL Tx beam $BM_1$ and determines that the DL Tx beam $BM_3$ that has not been configured in a beam pair link has the best beam quality. Accordingly, the UE 104 initiates an UL transmission on the UL beam recovery resource associated with the DL Tx beam $BM_3$ according to the UL resource association message.

As mentioned above, in this embodiment, the type of the UL transmission initiated by the UE 104 is a scheduling-request type. Therefore, in operation 710, the UE 104 may transmit a scheduling request to the base station 102 on the UL beam recovery resource to request the base station 102 to provide a UL transmission grant.

In operation 712, the base station 102 transmits the DL data, the UL transmission grant and the beam configuration message to the UE 104 via the DL Tx beam $BM_2$. In an embodiment, the base station 102 may shorten the minimum period of transmitting the DL data and the UL transmission grant to the UE 104 during the data transmission. For example, the base station 102 may adjust the minimum period of transmitting the DL data and the UL transmission grant using the secondary beam pair link to be the same as that using the primary beam pair link, so as to improve the efficiency of data transmission.

In operation 714, the base station 102 and the UE 104 perform data transmission through the newly configured beam pair link (corresponding to the beam $BM_3$) and the still-usable beam pair link (corresponding to the beam $BM_2$).

In the above embodiment, the newly configured beam (e.g., the DL Tx beam $BM_3$) and the still-usable beam (e.g., the DL Tx beam $BM_2$) are provided by the same base station 102. However, it should be noted that the disclosure is not limited thereto. In some embodiments, when a DL Tx beam failure event occurs, the first DL Tx beam newly selected by the UE 104 and the originally used DL Tx beam may be provided by different base stations. In this case, before the first DL Tx beam (e.g., the DL Tx beam $BM_3$) is actually configured into the beam pair link, the base station that provides the original DL Tx beam needs to use DL antenna ports that are quasi-colocation (QCI) with the reference signal measured on the DL Tx beam $BM_3$ to transmit DL data and the beam configuration message.

According to the various embodiments of the present disclosure described above, a plurality of UL beam recovery resources are pre-allocated to the UE. The UE can use the UL beam recovery resources to initiate an UL transmission when detecting a DL Tx beam failure event. In response to the UL transmission initiated by the UE, the base station may determine a proper DL Tx beam in time to communicate with the UE. Accordingly, the wireless transmission mechanism of the present disclosure can not only improve the service reliability of beamforming, but also reduce the transmission delay caused by varying beam quality.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A base station for a wireless communication system, being capable of providing a plurality of downlink (DL) transmit (Tx) beams and adapted to communicating with a user equipment (UE) in the wireless communication system via one or more beam pair links, the base station comprising:
a transceiver; and
a processor coupled to the transceiver, being configured to execute the following operations:
generating an uplink (UL) resource association message, wherein the UL resource association message is used to indicate an association between the DL Tx beams and a plurality of UL beam recovery resources;
transmitting the UL resource association message through the transceiver;
detecting whether an UL transmission is on any of the UL beam recovery resources, wherein the UL transmission is initiated by the UE responding to a DL Tx beam failure event; and
upon detecting that the UL transmission is on a first UL beam recovery resource of the UL beam recovery resources, transmitting a beam configuration message to configure a first DL Tx beam of the DL Tx beams that is associated with the first UL beam recovery resource into the one or more beam pair links,
wherein the processor is further configured to:
configure a plurality of reference signal sets for the respective DL Tx beams; and
transmit the reference signal sets corresponding to the DL Tx beams to the UE, wherein the reference signal sets are provided to the UE for measuring beam quality of the DL Tx beams, so that the UE uses, upon detecting that the DL Tx beam failure event occurs, a DL Tx beam with the best beam quality as the first DL Tx beam and performs the UL transmission on the first UL recovery transmission resource associated with the first DL Tx beam.

2. The base station of claim 1, wherein the UL transmission comprises at least one of (1) a beam recovery signal for notifying the base station of an occurrence of the DL Tx beam failure event, (2) a scheduling request for notifying the base station of the occurrence of the DL Tx beam failure event and requesting the base station to provide an UL transmission grant and (3) user data of a grant-free UL transmission.

3. The base station of claim 1, wherein the UL transmission further comprises a UE identifier (ID).

4. The base station of claim 1, wherein the UL transmission further comprises a beam index message indicating one or more beam pair links that are still usable in the one or more beam pair links.

5. The base station of claim 1, wherein the base station receives a detection period indication from the UL transmission, and determines a minimum period for transmitting a control signal according to the detection period indication.

6. A user equipment (UE) for a wireless communication system, being capable of communicating with a base station in the wireless communication system via one or more beam pair links and comprising:
a transceiver; and
a processor coupled to the transceiver, being configured to execute the following operations:
receiving an uplink (UL) resource association message through the transceiver, wherein the UL resource association message is used to indicate an association between a plurality of downlink (DL) transmit (Tx) beams of the base station and a plurality of UL beam recovery resources;
determining whether a DL Tx beam failure event occurs;
upon determining that the DL Tx beam failure event occurs, selecting a first DL Tx beam from the DL Tx beams and performing an UL transmission on a first UL beam recovery resource associated with the first DL Tx beam; and
receiving a beam configuration message through the transceiver and configuring the first DL Tx beam into the one or more beam pair links accordingly,
wherein the UL transmission further comprises a detection period indication for indicating the base station a minimum period for transmitting a control signal.

7. The UE of claim 6, wherein the processor is further configured to:
   receive a plurality of reference signal sets from the base station through the transceiver; and
   measure the reference signal sets to select a DL Tx beam with the best beam quality from the DL Tx beams;
   wherein the DL Tx beam with the best beam quality is used as the first DL Tx beam.

8. The UE of claim 6, wherein the UL transmission comprises at least one of (1) a beam recovery signal for notifying the base station of an occurrence of the DL Tx beam failure event, (2) a scheduling request for notifying the base station of the occurrence of the DL Tx beam failure event and requesting the base station to provide an UL transmission grant and (3) user data of a grant-free UL transmission.

9. The UE of claim 6, wherein the UL transmission further comprises a UE identifier (ID).

10. The UE of claim 6, wherein the UL transmission further comprises a beam index message indicating one or more beam pair links that are still usable in the one or more beam pair links.

11. A transmission control method for a base station of a wireless communication system, wherein the base station is capable of providing a plurality of downlink (DL) transmit (Tx) beams and adapted to communicating with a user equipment (UE) in the wireless communication system via one or more beam pair links, the transmission control method comprises:
   generating an uplink (UL) resource association message, wherein the UL resource association message is used to indicate an association between the DL Tx beams and a plurality of UL beam recovery resources;
   transmitting the UL resource association message;
   detecting whether an UL transmission is on any of the UL beam recovery resources, wherein the UL transmission is initiated by the UE responding to a DL Tx beam failure event;
   upon detecting that the UL transmission is on a first UL beam recovery resource of the UL beam recovery resources, transmitting a beam configuration message to configure a first DL Tx beam associated with the first UL beam recovery resource in the DL Tx beams into the one or more beam pair links;
   configuring a plurality of reference signal sets for the respective DL Tx beams; and
   transmitting the reference signal sets corresponding to the DL Tx beams to the UE, wherein the reference signal sets are provided to the UE for measuring beam quality of the DL Tx beams, so that the UE uses, upon detecting that the DL Tx beam failure event occurs, a DL Tx beam with the best beam quality as the first DL Tx beam and performs the UL transmission on the first UL recovery transmission resource associated with the first DL Tx beam.

12. The transmission control method of claim 11, wherein the UL transmission comprises at least one of (1) a beam recovery signal for notifying the base station of an occurrence of the DL Tx beam failure event, (2) a scheduling request for notifying the base station of the occurrence of the DL Tx beam failure event and requesting the base station to provide an UL transmission grant and (3) user data of a grant-free UL transmission.

13. The transmission control method of claim 11, wherein the UL transmission further comprises a UE identifier (ID).

14. A data transmission method for a user equipment (UE) of a wireless communication system, wherein the UE is capable of communicating with a base station in the wireless communication system via one or more beam pair links, and the data transmission method comprises:
   receiving an uplink (UL) resource association message, wherein the UL resource association message is used to indicate an association between a plurality of downlink (DL) transmit (Tx) beams of the base station and a plurality of UL beam recovery resources;
   determining whether a DL Tx beam failure event occurs;
   upon determining that the DL Tx beam failure event occurs, selecting a first DL Tx beam from the DL Tx beams and performing an UL transmission on a first UL beam recovery resource associated with the first DL Tx beam; and
   receiving a beam configuration message and configuring the first DL Tx beam into the one or more beam pair links accordingly,
   wherein the UL transmission further comprises a detection period indication for indicating the base station a minimum period for transmitting a control signal.

15. The data transmission method of claim 14, further comprising:
   receiving a plurality of reference signal sets from the base station; and
   measuring the reference signal sets to select a DL Tx beam with the best beam quality from the DL Tx beams;
   wherein the DL Tx beam with the best beam quality is used as the first DL Tx beam.

16. The data transmission method of claim 14, wherein the UL transmission comprises at least one of (1) a beam recovery signal for notifying the base station of an occurrence of the DL Tx beam failure event, (2) a scheduling request for notifying the base station of the occurrence of the DL Tx beam failure event and requesting the base station to provide an UL transmission grant and (3) user data of a grant-free UL transmission.

17. The data transmission method of claim 14, wherein the UL transmission further comprises a UE identifier (ID).

* * * * *